(12) United States Patent
Chen et al.

(10) Patent No.: US 7,590,737 B1
(45) Date of Patent: Sep. 15, 2009

(54) SYSTEM AND METHOD FOR CUSTOMIZED I/O FENCING FOR PREVENTING DATA CORRUPTION IN COMPUTER SYSTEM CLUSTERS

(75) Inventors: Grace Chen, San Jose, CA (US); Bob Schatz, San Carlos, CA (US); Shardul Divatia, Freemont, CA (US)

(73) Assignee: Symantec Operating Corporation, Cupertino, CA (US)

( * ) Notice: Subject to any disclaimer, the term of this patent is extended or adjusted under 35 U.S.C. 154(b) by 797 days.

(21) Appl. No.: 10/893,621

(22) Filed: Jul. 16, 2004

(51) Int. Cl.
*G06F 15/173* (2006.01)
*G06F 11/00* (2006.01)

(52) U.S. Cl. .................. 709/226; 709/223; 709/224; 709/225; 714/4; 714/25; 714/31

(58) Field of Classification Search .......... 709/204, 709/208, 220, 223–226, 230, 237; 711/154; 714/4, 29, 23, 31, 25
See application file for complete search history.

(56) References Cited

U.S. PATENT DOCUMENTS

| | | | | |
|---|---|---|---|---|
| 5,999,712 | A | 12/1999 | Moiin et al. .............. 395/200.5 |
| 6,161,191 | A * | 12/2000 | Slaughter et al. ................ 714/4 |
| 6,173,413 | B1 * | 1/2001 | Slaughter et al. ................ 714/6 |
| 6,192,401 | B1 | 2/2001 | Modiri et al. ................ 709/220 |
| 6,192,443 | B1 * | 2/2001 | Mendel ......................... 711/1 |
| 6,226,717 | B1 | 5/2001 | Reuter et al. ................. 711/147 |
| 6,279,032 | B1 | 8/2001 | Short et al. ................... 709/209 |
| 6,286,056 | B1 | 9/2001 | Edgar et al. ..................... 710/5 |
| 6,338,112 | B1 | 1/2002 | Wipfel et al. ................ 710/269 |
| 6,658,587 | B1 * | 12/2003 | Pramanick et al. ............. 714/5 |
| 2001/0032324 | A1 | 10/2001 | Slaughter et al. ................ 714/4 |
| 2002/0095470 | A1 * | 7/2002 | Cochran et al. ............. 709/208 |
| 2003/0023680 | A1 * | 1/2003 | Shirriff ....................... 709/204 |
| 2005/0283641 | A1 * | 12/2005 | Clark et al. ..................... 714/4 |

OTHER PUBLICATIONS

*Data Integrity in Cluster File Systems, Assuring Consistency When Servers Fail: STOMITH versus Fabric Fencing*, PolyServe White Paper, pp. 1-7, Oct. 2003, www.polyserve.com.

Alan Robertson, *Resource Fencing Using STONITH*, IMB Linux Technology Center, Broomfield, Colorado, pp. 1-9, Oct. 2001, www.alanr@us.ibm.com.

* cited by examiner

*Primary Examiner*—Saleh Najjar
*Assistant Examiner*—Farzana Huq
(74) *Attorney, Agent, or Firm*—Campbell Stephenson LLP (57) ABSTRACT

Systems, methods, apparatus and software can implement a flexible I/O fence mechanism framework allowing clustered computer systems to conveniently use one or more I/O fencing techniques. Various different fencing techniques can be used, and fencing mechanism can be customized.

33 Claims, 7 Drawing Sheets

SYSTEM AND METHOD FOR CUSTOMIZED I/O FENCING FOR PREVENTING DATA CORRUPTION IN COMPUTER SYSTEM CLUSTERS

FIELD OF THE INVENTION

The present invention relates to the field of fault tolerance in distributed computer systems and, more particularly, to preventing data corruption on a shared resource of a computer system cluster.

BACKGROUND OF THE INVENTION

Distributed computing systems are an increasingly important part of research, governmental, and enterprise computing systems. Among the advantages of such computing systems are their ability to handle a variety of different computing scenarios including large computational problems, high volume data processing situations, and high availability situations. For applications that require the computer system to be highly available, e.g., the ability to maintain the system while still providing services to system users, a cluster of computer systems is a useful implementation of the distributed computing model. In the most general sense, a cluster is a distributed computer system that works together as a single entity to cooperatively provide processing power and mass storage resources. With a cluster, the processing load of the computer system is typically spread over more than one computer, thereby eliminating single points of failure. Consequently, programs executing on the cluster can continue to function despite a problem with one computer in the cluster. In another example, one or more computers of the cluster can be ready for use in the event that another computer in the cluster fails. While each computer in a cluster typically executes an independent instance of an operating system, additional clustering software is executed on each computer in the cluster to facilitate communication and desired cluster behavior.

Figure 1:
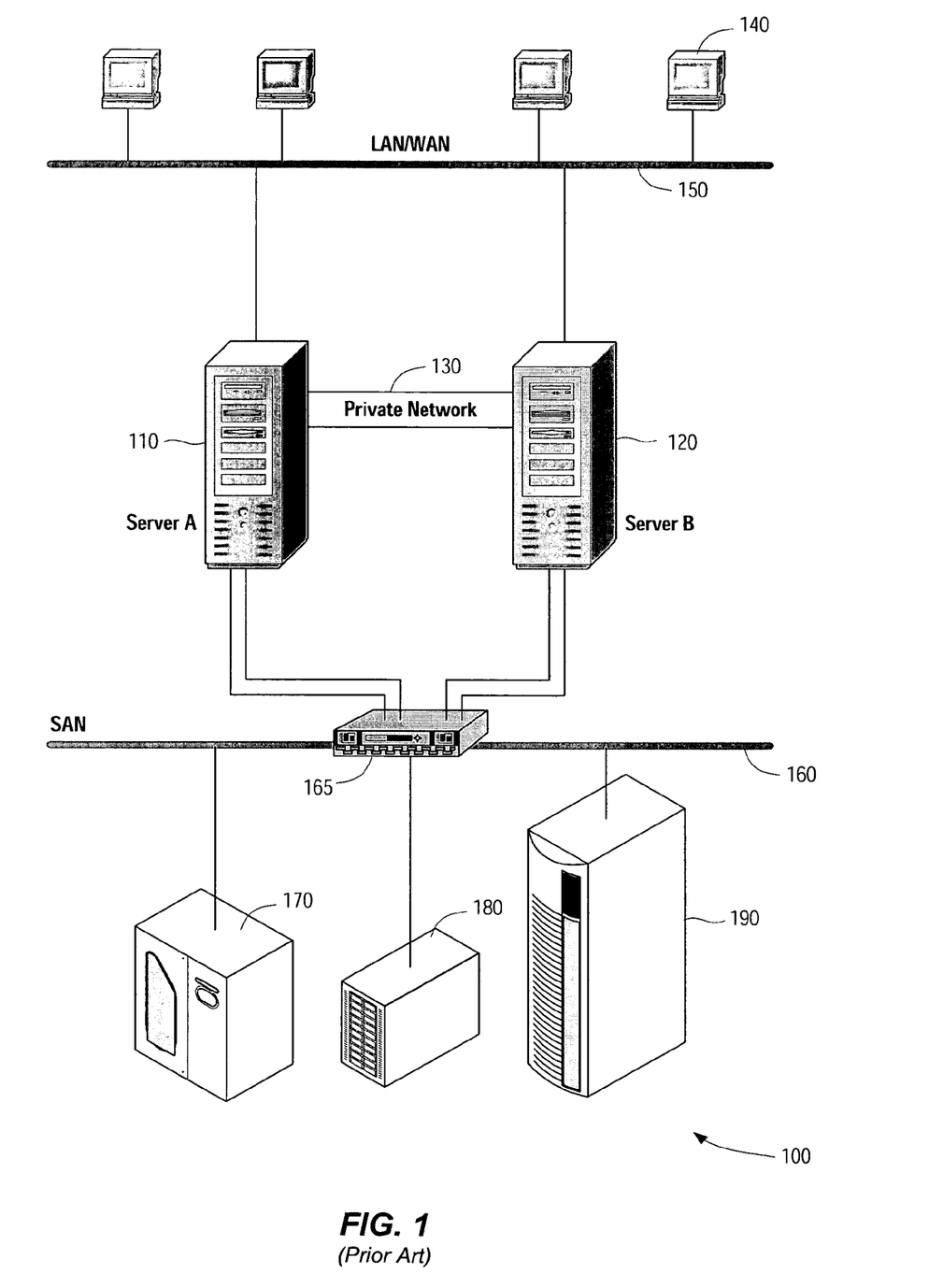
FIG. 1 is a simplified block diagram of a computer system cluster.
Figure 6:
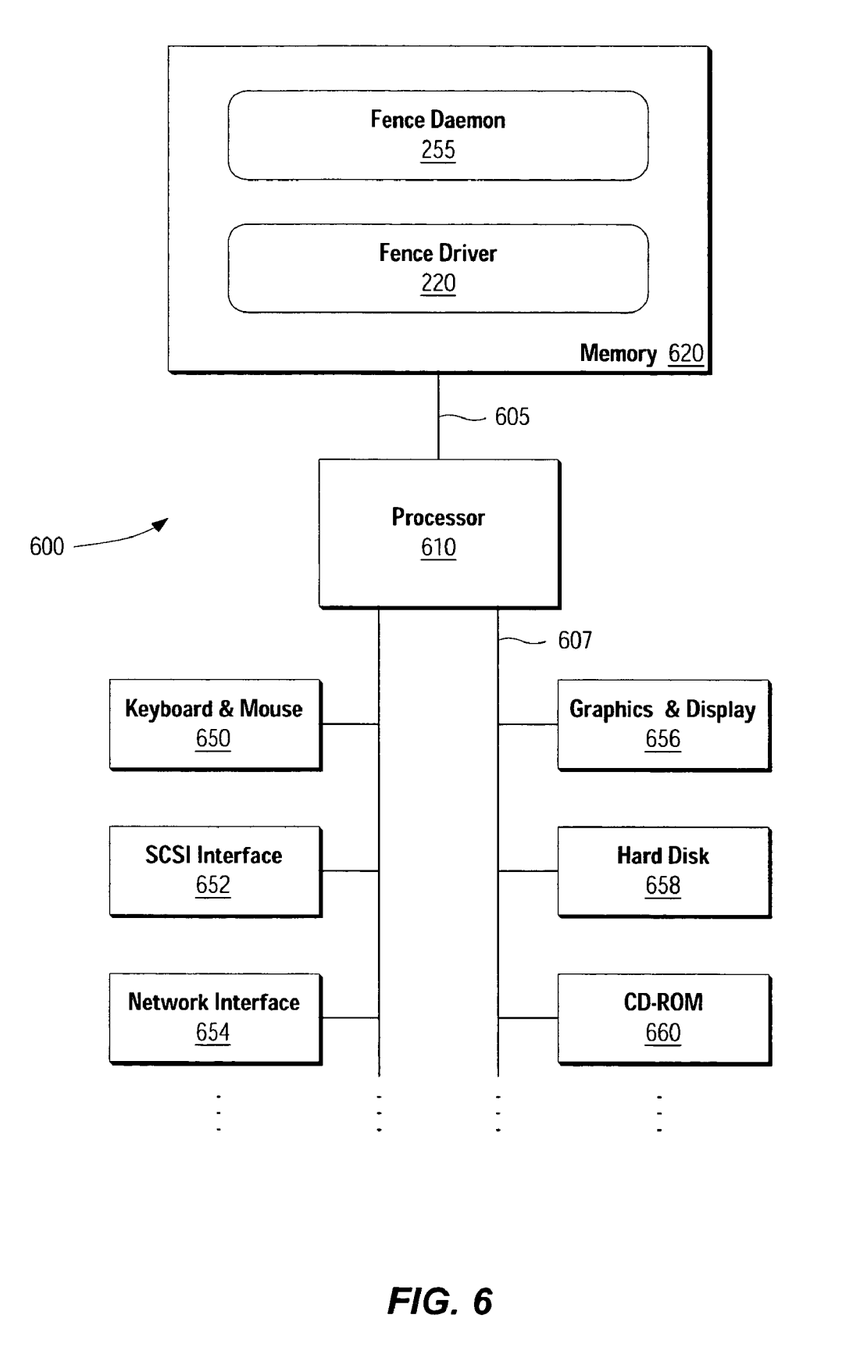
FIG. 6 is a block diagram of a computer system for implementing the techniques of the present invention.

FIG. 1 illustrates a simplified example of a cluster 100. The members of the cluster include Server A 110 and Server B 120. As members of cluster 100, servers 110 and 120 are often referred to as "hosts" or "nodes." Thus, a node in a computer cluster is typically an individual computer system having some or all of the common as is well known in the art. FIG. 6 (described later in this application) illustrates some of the features common to cluster nodes. Another common feature of a cluster is the ability of the nodes to exchange data. In the example of FIG. 1, servers 110 and 120 can exchange data over network 150, typically a local area network (LAN), e.g., an enterprise-wide intranet, or a wide area network (WAN) such as the Internet. Additionally, network 150 provides a communication path for various client computer systems 140 to communicate with servers 110 and 120. In addition to network 150, servers 110 and 120 can communicate with each other over private network 130. As shown, private network 130 is only accessible by cluster nodes, i.e., Server A 110 and Server B 120. To support the high availability of cluster 100, private network 130 typically includes redundancy such as two network paths instead of one. Private network 130 is used by the nodes for cluster service message passing including, for example, the exchange of so-called "heart-beat" signals indicating that each node is currently available to the cluster and functioning properly.

Other elements of cluster 100 include storage area network (SAN) 160, SAN switch 165, and storage devices such as tape library 170 (typically including one or more tape drives), a group of disk drives 180 (i.e., "just a bunch of disks" or "JBOD"), and intelligent storage array 190. These devices are examples of the type of storage used in cluster 100. Other storage schemes include the use of shared direct-attached storage (DAS) over shared SCSI buses. SAN 160 can be implemented using a variety of different technologies including fibre channel arbitrated loop (FCAL), fibre channel switched fabric, IP networks (e.g., iSCSI), Infiniband, etc.

SAN switch 165 and storage devices 170, 180, and 190 are examples of shared resources. The most common shared resource in a cluster is some form of shared data resource, such as one or more disk drives. Using a shared data resource gives different nodes in the cluster access to the same data, a feature that is critical for most cluster applications. Although a disk device is perhaps the most common example of both a shared resource and a shared data resource, a variety of other types of devices will be well known to those having ordinary skill in the art. Moreover, although servers 110 and 120 are shown connected to storage array storage devices through SAN switch 165 and SAN 160, this need not be the case. Shared resources can be directly connected to some or all of the nodes in a cluster, and a cluster need not include a SAN. Alternatively, servers 110 and 120 can be connected to multiple SANs. Additionally, SAN switch 165 can be replaced with a SAN router or a SAN hub.

One known problem among computer system clusters occurs when one or more of the nodes of the cluster erroneously believes that other node(s) are either not functioning properly or have left the cluster. This "split-brain" condition results in the effective partitioning of the cluster into two or more subclusters. Causes of the split-brain condition include failure of the communication channels between nodes, e.g., failure of private network 130, and the processing load on one node causing an excessive delay in the normal sequence of communication among nodes, e.g., one node fails to transmit its heartbeat signal for an excessive period of time. For example, if cluster 100 is configured for failover operation with an application program operating on server A 110 and server B 120 existing in the cluster to takeover for server A should it fail, then complete failure of private network 130 would lead server B to conclude that server A has failed. Server B then begins operation even though server A has not in fact failed. Thus, the potential exists that the two servers might attempt to write data to the same portion of one of the storage devices thereby causing data corruption. The solution is to ensure that one of the nodes cannot access the shared resource, i.e., to "fence off" the node from the resource.

Cluster partitioning can take a variety of other forms and have a variety of detrimental effects. For example, a node might attempt to reenter a cluster after the node has already been successfully excluded from the cluster. Thus, the reentering node might encounter a cluster environment setup to exclude the node and interpret that instead as a partition event. Additionally, cluster partitioning can be problematic even though there is no shared resource among the cluster nodes, so called "shared nothing" clusters. For example, if one node of a cluster is supposed to be the node interacting with a client device and another node detects a cluster partition, the client device could ultimately communicate with the wrong node thereby leading to some manner of error.

Many existing solutions to the split-brain problem focus on a single technique or mechanism for determining which nodes should remain in a cluster and how to protect shared data subsequent to a cluster partition event. One example of such a solution can be found in the pending U.S. patent application Ser. No. 10/105,771, entitled "System and Method for Preventing Data Corruption in Computer System Clusters," naming Bob Schatz and Oleg Kiselev as inventors, and filed on Mar. 25, 2002 ("the '771 application") which is hereby incorporated by reference herein in its entirety.

While techniques such as those described in the '771 application adequately address split-brain problems, they may suffer some other deficiency that makes them less desirable. For example, fencing techniques that make use of SCSI-3 persistent reservation commands (such as those described in the '771 application) can require the use of specialized hardware such as SCSI-3 compliant devices. This requirement may impose certain cost or flexibility restrictions that make the particular technique less desirable. Moreover, some cluster implementations may benefit from the use of multiple different fence mechanisms, rather than a single fence mechanism.

Accordingly, it is desirable to have a generalized I/O fencing framework for providing and using one or more scalable, flexible, and robust I/O fencing schemes for handling cluster partition conditions.

SUMMARY OF THE INVENTION

It has been discovered that systems, methods, apparatus and software can implement a flexible I/O fence mechanism framework allowing clustered computer systems to conveniently use one or more I/O fencing techniques. Various different fencing techniques can be used, and fencing mechanism can be customized.

Accordingly, one aspect of the present invention provides a method. At least one of a plurality of input/output (I/O) fence mechanisms is selected. The at least one of a plurality of I/O fence mechanisms uses at least one coordinator resource. Computer system cluster (including a plurality of nodes) partitioning is detected. An attempt is made to gain control of the at least one coordinator resource using the at least one of a plurality of I/O fence mechanisms. At least one of the plurality of nodes is removed from the computer system cluster in response to the attempting to gain control.

In another aspect of the present invention, a system includes a plurality of fence mechanism modules, a fence mechanism manager configured to invoke at least one of the plurality of fence mechanism modules, and a fence driver in communication with the fence mechanism manager. Each fence mechanism module configured to implement at least one input/output (I/O) fence mechanism. The at least one of the plurality of fence mechanism modules uses at least one coordinator resource. The fence driver is configured to receive an indication that a distributed computer system has partitioned into at least two subclusters and to cause at least one of the fence mechanism manager and the at least one of the plurality of fence mechanism modules to attempt to control of the at least one coordinator resource.

Still another aspect of the present invention provides a computer readable medium comprising program instructions executable on a processor, the computer readable medium being at least one of an electronic storage medium, a magnetic storage medium, an optical storage medium, and a communications medium conveying signals encoding the instructions. The program instructions are operable to implement each of: selecting at least one of a plurality of input/output (I/O) fence mechanisms, wherein the at least one of a plurality of I/O fence mechanisms uses at least one coordinator resource; detecting when a computer system cluster including a plurality of nodes is partitioned; attempting to gain control of the at least one coordinator resource using the at least one of a plurality of I/O fence mechanisms; and removing at least one of the plurality of nodes from the computer system cluster in response to the attempting to gain control.

Yet another aspect of the present invention provides an apparatus including: a means for selecting at least one of a plurality of means for performing input/output fencing, wherein the at least one of a plurality of means for performing I/O fencing uses at least one coordinator means; a means for detecting when a computer system cluster including a plurality of nodes is partitioned; a means for attempting to gain control of the at least one coordinator means using the at least one of a plurality of means for performing I/O fencing; and a means for removing at least one of the plurality of nodes from the computer system cluster.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways including implementation in hardware, i.e. ASICs and special purpose electronic circuits, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

A more complete understanding of the present invention and advantages thereof may be acquired by referring to the following description and the accompanying drawings, in which like reference numbers indicate like features.

DETAILED DESCRIPTION

The following sets forth a detailed description of at least the best contemplated mode for carrying out the one or more devices and/or processes described herein. The description is intended to be illustrative and should not be taken to be limiting.

Figure 2:
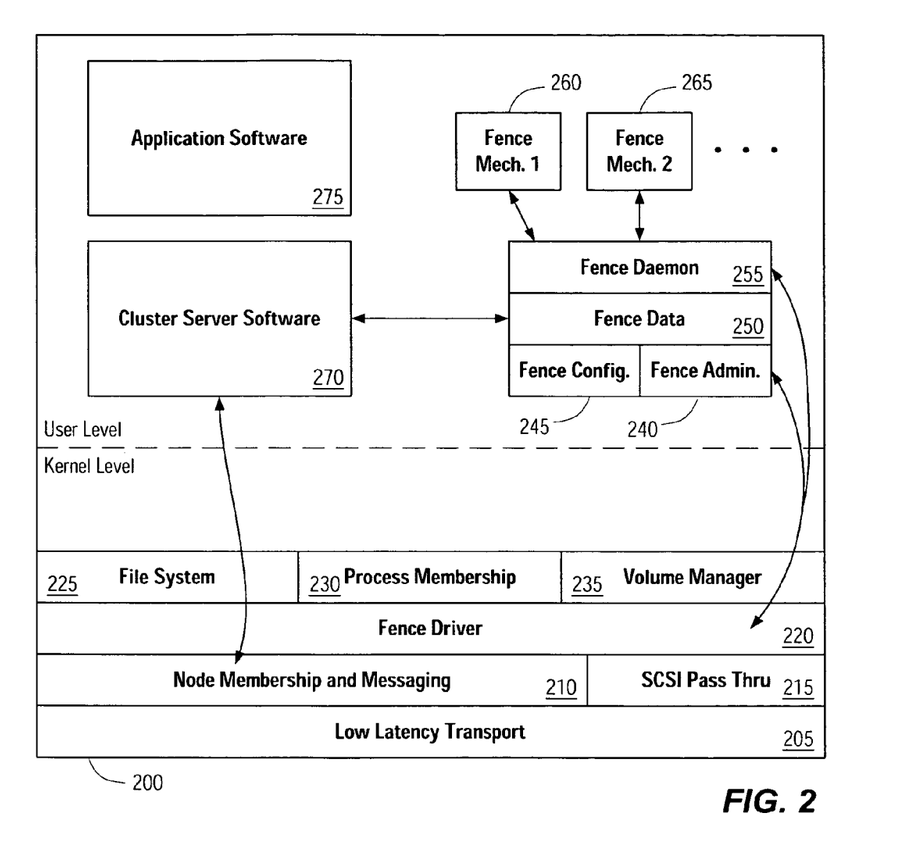
FIG. 2 illustrates some of the software components of a computer system cluster as executed on one node of the cluster.

FIG. 2 illustrates some of the software components of a computer system cluster as executed on one node of the cluster. The components illustrated include those used to provide a generalized framework within which one or more different I/O fence mechanisms can be employed to protect a computer system cluster.

Memory 200 is a representative memory space of a cluster node. In general, the software components are divided into those components operating at the kernel level, and those operating at the user level, as is well known in the art. Kernel level components include some basic software components supporting cluster operation. For example, low latency transport 205 provides high-speed kernel-to-kernel communications and monitors network connections between nodes. Node membership and messaging 210 is a kernel component that maintains and monitors node membership in the cluster. Node membership and messaging 210 can also provide a messaging mechanism to other software components, e.g., file system 225, process membership 230, volume manager 235, and cluster server software 270. Alternatively, the functions performed by node membership and messaging 210 could be performed by software operating at the user level. SCSI pass through 215 is an example of a hardware driving component for sending SCSI commands from other components to SCSI devices, such as the data disks in devices 180 and 190 and certain coordinator resources used by I/O fence mechanisms that are designed to receive SCSI commands, i.e., SCSI-2 and SCSI-3 compliant devices.

Fence driver 220 operates in conjunction with fence daemon 255 and various fence mechanisms 260 and 265 to prevent ejected cluster nodes, i.e., nodes that have lost cluster membership because of some connectivity failure, from accessing shared storage resources, causing data corruption, or otherwise disrupting expected cluster behavior (e.g., shared-nothing cluster operation). For example, fence driver 220 receives node membership information either directly or indirectly from node membership and messaging component 210. Once node membership and messaging 210 learns that communication with another cluster node has been lost, i.e., that the cluster has partitioned, it can directly inform fence driver 220, which in turn begins taking action to protect shared resources. Alternately, node membership and messaging 210 informs other kernel components such as file system 225, process memberships 230, or volume manager 235, that communication with another cluster node has been lost. Subsequent communication between the informed kernel component(s) and fence driver 220 is the mechanism by which partition event information is passed to fence driver 220. For example, upon receiving cluster membership change information from component 210, a component such as process membership 230 can query fence driver 220 to determine whether it is safe, e.g., the split-brain condition has been resolved, to process membership change information. Fence driver 220 will not typically allow process membership 230 to proceed until fencing operations are sufficiently complete. File system kernel component 225 provides and/or supports additional (beyond typical operating system file system capabilities) file system features including for example: quick-recovery, journaling, backup without data lock out, and online file system resizing. Process membership component 230 monitors and controls the membership of processes in the node and ensures that information on current member processes remains the same on all cluster nodes. Volume manager 235 enables physical resources configured in the cluster to be managed as logical devices or volumes.

Those having ordinary skill in the art will readily recognize that a variety of different additional kernel components can be (and typically are) utilized by a cluster node. Many of the components described above as well as some of the user level components described below are part of one or more of the VERITAS Volume Manager™, VERITAS File System™, and VERITAS Cluster Server™ products provided by VERITAS Software Corporation.

Fence driver 220, fence daemon 255, and fence mechanisms 260 and 265, can operate in conjunction with fence configuration software 245, fence administration software 240, and fence data 250. For example, fence configuration software 245 can be used by a system operator to specify and initialize information stored in a coordinator resource, e.g., which nodes are part of the cluster, as well as to configure fence driver 220 and fence daemon 255. For those devices to which an attached volume maps, volume manager 235 can issue to SCSI pass through 215 commands for reading and displaying keys, registering with devices, making a reservation with a device, removing registrations made by other devices, reading reservations, and removing registrations. Together with fence driver 220, fence daemon 255, and fence mechanisms 260 and 265, components 240, 245, and 250 provide core functionality for the I/O fencing services used to prevent data corruption. Note that one or more of components 240, 245, 250, 255, 260, and 265 can be included within other components, and/or several components can be combined.

The user level also typically includes software components such as the previously mentioned cluster server software 270 and application software 275, e.g., database administration systems (DBMS), file servers, application servers, web servers, backup and restore software, customer relationship management software, and the like.

Fencing components use one or more coordinator resources as part of the I/O fencing operation. The use of coordinator resources enables the fencing components to resolve split-brain conditions occurring in cluster computer systems. In general, when a split-brain condition occurs, a designated node in each subcluster, e.g., the lowest numbered node, "races" to gain control of the coordinator resource(s). The winning node remains in the cluster, and fence components are used to fence losing nodes off from the shared data storage and/or remove the nodes from the cluster. This can be accomplished by causing nodes to lose their membership in the cluster, e.g., as reflected in membership records stored in a coordinator resource. The nodes remove themselves from the cluster ("commit suicide") upon recognizing that they have lost membership. In still other examples, nodes are forcibly removed from the cluster by, for example, cycling their power. Ejected systems cannot write to the data disks, and therefore the potential for corrupt data is greatly reduced or eliminated.

In the generalized I/O fence framework illustrated in FIG. 2, much of the functionality for implementing various I/O fence techniques is contained in each of the fence mechanisms 260 and 265. In general, each fence mechanism is a separate module, e.g., a separate executable, script, DLL, etc., that is used in conjunction with the other fence components illustrated to implement a particular I/O fencing scheme. Numerous different I/O fence mechanisms can be implemented, some of which are discussed in greater detail below with respect to FIGS. 5A-5F.

Fence mechanisms can be differentiated by the type of coordinator resource or resources used to determine which node or nodes remain in the cluster. Examples of the different coordinator resources used by fence mechanisms include: SCSI-3 compliant devices where SCSI-3 persistent reservation and registration commands are used to register with and gain control of the devices in order to determine the node or nodes that will remain in the cluster; SCSI-2 compliant devices where SCSI-2 reservation and registration commands are used to register with and gain control of the devices in order to determine the node or nodes that will remain in the cluster; remote access power distribution units that provide power to cluster nodes and can be used to cycle the power or turn nodes off; node hardware and/or software that supports a standard for receiving remote management commands such as the Intelligent Platform Management Interface (IPMI) standard; virtual devices such as specifically defined volumes for use in a manner similar to SCSI devices; management processors or computer systems that are coupled to the cluster but are not nodes of the cluster and provide some cluster management functionality (e.g., the blade management processor of a blade server system); storage area network devices (e.g., switches, routers, etc) that can provide SAN zoning functionality to "zone out" node access to certain storage elements; arbitrator processes operating on a computer system, typically remote from the cluster nodes, control or ownership of which can confer success in a race for the coordinator resource; and contact-response systems where a person or program is contacted (e.g., via e-mail or telephone) and a designated response indicates control of the resource. Numerous other examples of coordinator resources and corresponding fence mechanisms will be known to those having ordinary skill in the art.

Thus, the coordinator resource or resources can include a variety of physical devices, logical devices, processes, and combinations thereof. One of the advantages of the framework illustrated in FIG. 2 is that it can, in general, accommodate any type of fence mechanism. Functionality specific to the particular I/O fencing technique is concentrated in a corresponding I/O fence mechanism (260, 265). Fence daemon 255 manages the various fence mechanisms, invokes them as necessary, provides supporting functionality, and interacts with fence driver 220 to, for example, get information about cluster membership and cluster partition conditions. For example, when node membership and messaging 210 receives information indicating that the node has lost contact with another node, it will inform fence driver 220 which in turn communicates with fence daemon 255. Fence daemon 255 operates in association with an appropriate fence mechanism to perform the corresponding fencing operation.

While various fence mechanisms will tend to differ based on differences among the coordinator resources used, fence driver 220, fence daemon 255 and any fence mechanism will typically operate in conjunction with each other to provide one or more of the following functionalities: the ability to generate and compare mechanism comparison information to ensure that the there are no critical differences in the instance/version of the fence mechanism used by the nodes of a cluster; the ability to join a particular node to a cluster; the ability to race for the coordinator resource(s) so that only one node can win the race; the ability to fence off data resources that must be protected from possible data corruption; the ability to unjoin a node from a cluster under certain circumstances (typically when the node gracefully and successfully leaves the cluster); and the ability to exit a node from the cluster (either in a un-graceful, error-driven situation or in an unjoin situation where there is a related error condition).

In some cases, the manner in which one or more of these functionalities is implemented will be very specific to the fencing technique used by the fence mechanism. For example, the race operation for SCSI-2 or SCSI-3 devices includes the issuing of various SCSI commands to try to gain control of the coordinator resource(s), while the race for control of power distribution units supplying power to nodes of the cluster might simply entail issuing "power off" commands. In other examples, different fence mechanisms may share the same or similar implementation of a particular functionality. Additionally, the type of fence mechanism and/or simple implementation details my dictate how the different system components perform different parts of the needed tasks. In one embodiment, communication between fence daemon 255 and fence driver 220 is performed according to an application programming interface (API). Such communication typically includes instructions to perform certain tasks, e.g., begin race for coordinator resource, and messages about operation status, e.g., race success/failure. Similarly, communication between fence daemon 255 and fence mechanisms can be via API calls or using other techniques well known to those having skill in the art.

Figure 3:
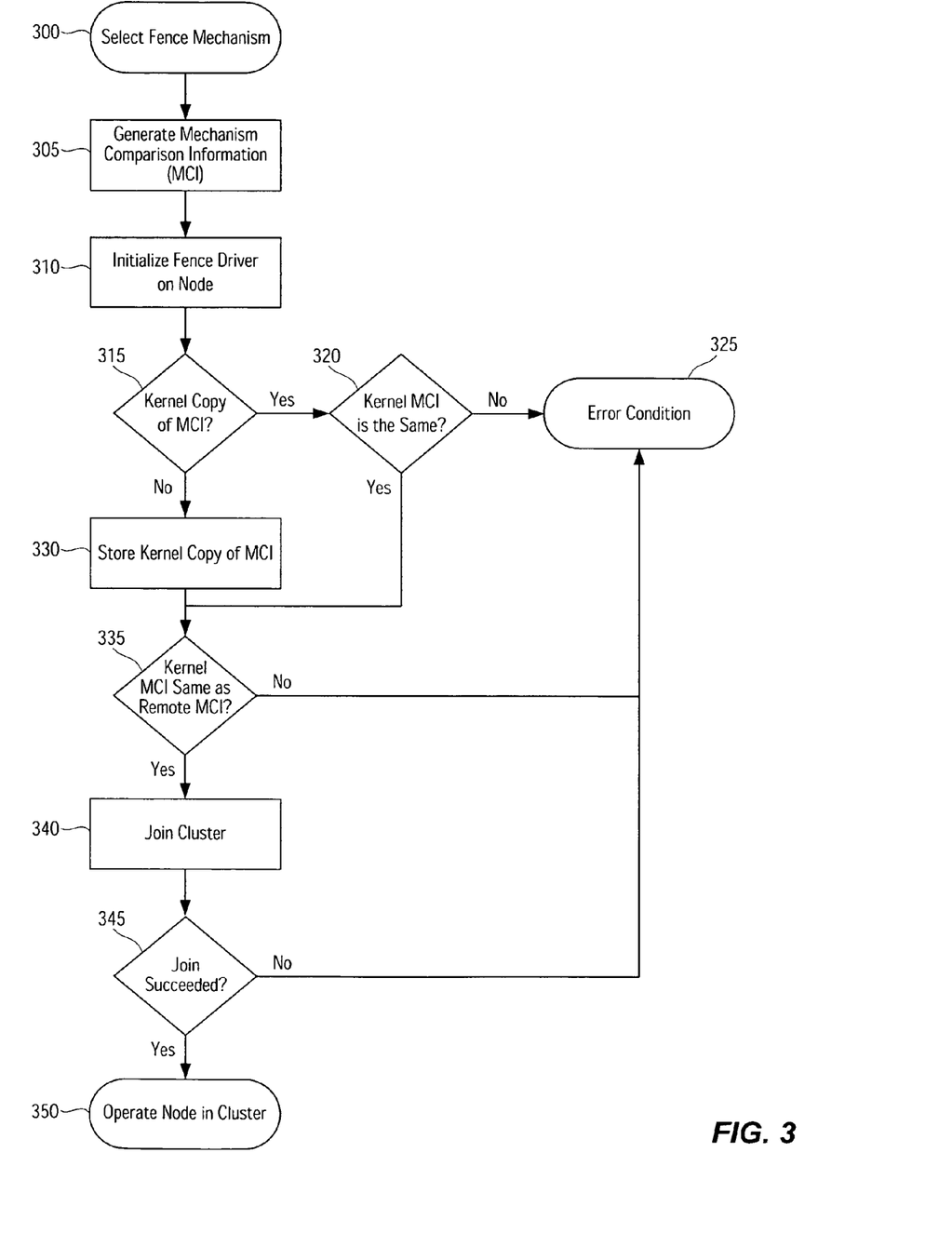
FIG. 3 is a flow chart illustrating some techniques of the present invention.

FIG. 3 illustrates some of the operation of the fencing components shown in FIG. 2. Operation begins at 300 where a fence mechanism is selected for use by the cluster system. This selection can be performed in a number of different ways. For example, a user, administrator, or software entity can specify a particular fence mechanism for use. Such operation may be performed in conjunction with one or more of the fence components illustrated in FIG. 2, such as fence configuration 245. Once a particular fence mechanism has been selected, mechanism comparison information is generated (305). Because it is desirable that each node in a cluster use the same mechanism, e.g., the same version/configuration of mechanism software, the same coordinator resource(s), etc., mechanism comparison information is generated so that it can be compared with local copies of such information, copies of the information from other nodes, reference copies of the information, etc. The mechanism comparison information can take a variety of different forms including: explicit version information, checksum information for mechanism files, coordinator resource identification information, and the like. In short, this operation takes a "snapshot" of relevant portions of the mechanism to ensure uniform mechanism operation across cluster nodes. In one embodiment, this step is performed by fence daemon 255 and/or a particular fence mechanism (260 and 265).

Next, a fence driver is initialized on the node in question as shown in step 310. Driver initialization typically includes such operations as configuring various other components, e.g., a fence daemon, confirming that the selected fence mechanism is compatible with the node and the cluster configuration, establishing contact with the coordinator resource (s), and the like. Still other initialization tasks can be performed at this time. In 315, it is determined whether a kernel copy of the mechanism comparison information is present on the node. In general, the kernel copy of the mechanism comparison information is associated with a particular instance of the fence driver on a given node. If, for example, an instance of the fence daemon and/or an associated fence mechanism is running, subsequently terminates, and a new instance is created (all while the same instance of the fence driver is running) the potential exists that there is a mismatch between previous mechanism comparison information and new mechanism comparison information. If there is a kernel copy, operation transitions to 320 where the kernel copy of the mechanism comparison information is compared with the copy generated in step 305. A difference in the copies is indicative of an error condition 325. Once operation proceeds to 325, a variety of other tasks can be performed. For example, a message can be sent to an administrator or another program/process, the driver can be unconfigured/unloaded, and execution of related programs (e.g., a fence daemon) can be suspended. In still other examples, steps can be taken to make sure that the corresponding node has not and will not join the cluster. If the kernel mechanism comparison information is the same as that generated in 305, operation transitions to 335. If there is no kernel mechanism comparison information as determined in 315, a copy is stored/retained as shown in step 330.

Next, the kernel mechanism comparison information is compared with remote mechanism comparison information (335). Such remote mechanism comparison information can include copies of mechanism comparison information generated by other nodes in the cluster, and sent to the node in question, remote mechanism comparison information retained in a remote location (i.e., not on the node), information from the coordinator resource, and the like. If the remote mechanism comparison information does not compare favorably with the kernel mechanism comparison information, operation transitions to error condition 325 as described above. If the information does compare favorably, the node then proceeds to join the cluster (340). The precise manner in which a node joins a cluster is beyond the scope of the present application. However, the cluster join operation may vary depending on the particular fence mechanism in use. To that end, some or all of the operation can be performed by fence daemon 255 and/or a particular fence mechanism (260 and 265). In still other examples, some or all of the required steps to join a cluster may be sufficiently common across multiple fence mechanisms that they can be without the use of components like fence mechanisms 260 and 265. In step 345, it is determined whether the join operation was a success. In one example, the join operation is performed by some combination of fence daemon 255 and a particular fence mechanism. After completing the join attempt, the fence daemon passes a corresponding message back to the fence driver. If the join operation succeeded, the node operates normally as cluster node (350). If the join operation failed, operation transitions to error condition 325.

Figure 4:
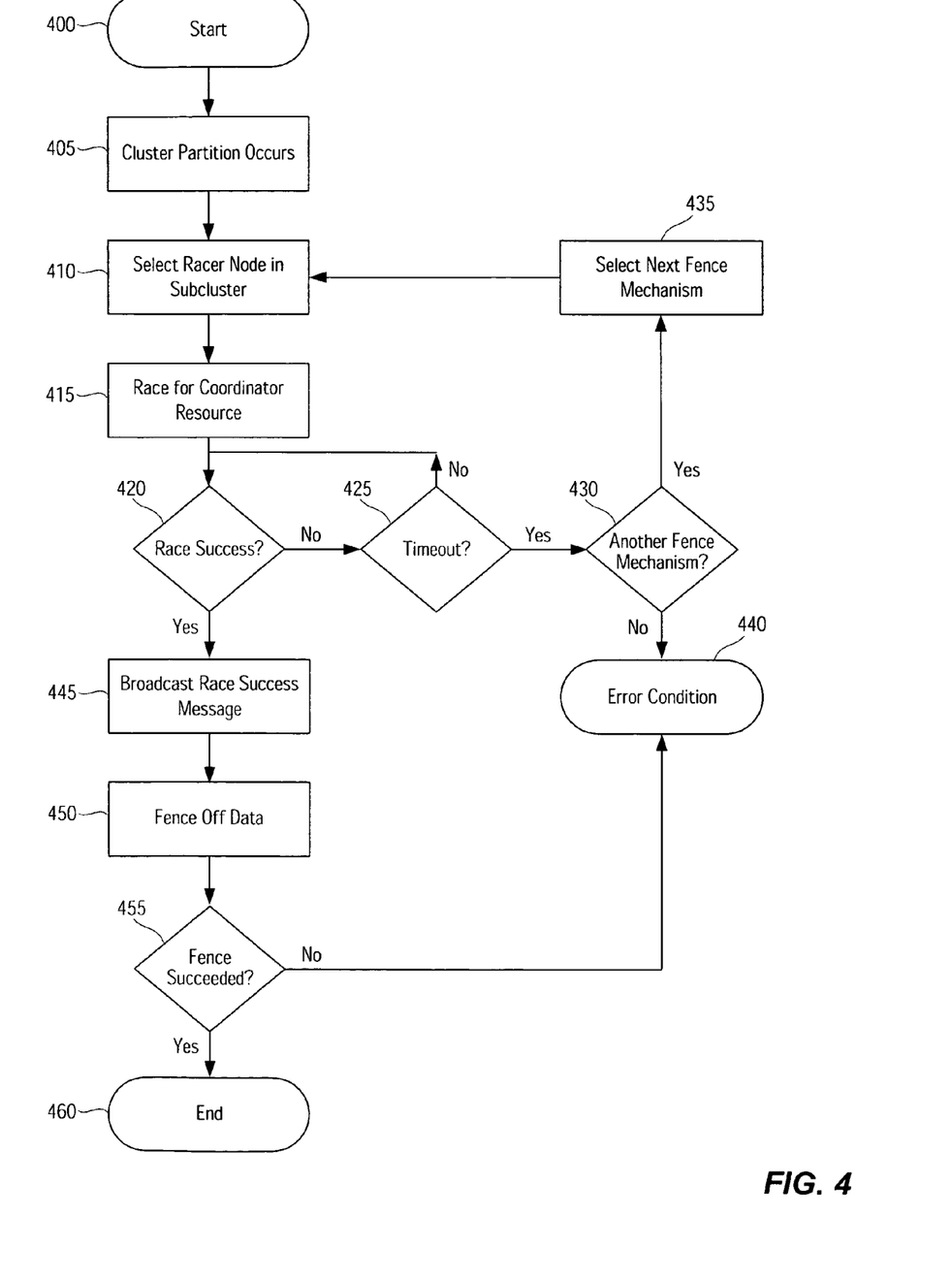
FIG. 4 is a flow chart illustrating still other techniques of the present invention.

FIG. 4 illustrates an example of operation of the fence components. Operation begins at 400 where a node in a cluster is normally operating, i.e., it has joined the cluster and is performing whatever designated function it has in the cluster. Thus, for example, the operational state represented by the activity in step 400 can be the same as the state represented by activity in 350 of FIG. 3. In step 405, something has caused the cluster to partition. For example, a private network between the nodes of the cluster has failed and two or more nodes lose contact with each other. Upon detection of the cluster partition, a racer node is selected in each subcluster (410). In a two node cluster, there will only be one node in each subcluster, so the determination in 410 is trivial or not performed at all. In subclusters with more than one node, one node is elected or designated as the note that will perform the race for the coordinator resource(s). Such selection can be based on node information, such as a node identifier. For example, the node in the subcluster with the smallest node ID can be selected as the racer. Numerous other techniques can be used to select the racer node, as will be understood by those having ordinary skill in the art.

In 415, the racer node races for the coordinator resource designated by the fence mechanism in use. Next, 420 determines whether the node has successfully gained control of the coordinator resource. If not, operation transitions to 425 where a timeout determination is made. For example, a given node's authorization to act as the racer may be limited by a requirement that it must succeed within a given time period. Such a feature is particularly useful where there are multiple nodes in a subcluster and it may be desirable to allow another node to operate as the racer after a certain time period. In another example, the timeout period is used to facilitate implementation of multiple fence mechanisms in the same cluster system. Thus, if a timeout period has occurred, operation can proceed to 430 where it is determined whether another fence mechanism is available. For example, a cluster can be configured to use a primary fence mechanism, e.g., SCSI-3 devices, and a secondary fence mechanism, e.g., power distribution units, in the event that the first mechanism fails to work properly. Alternatively, multiple fence mechanisms can be used in parallel (not illustrated). If there is another fence mechanism to use, operation transitions to 435 where that mechanism is selected. Operation then returns to 410 to proceed using the alternate mechanism. If there are no further mechanisms to be used, an error condition occurs (440). In many implementations, only one fence mechanism will be available, and there will be no need to perform operations like those illustrated at 430 and 435. Moreover, for a given race mechanism, there will typically be only one racer node in a given subcluster and if that racer node fails to win the race for any reason, all nodes in that subcluster will be ejected. In still other examples, expiration of a timeout time period can cause an error condition to occur, and subsequent steps like those discussed above with respect to step 325 of FIG. 3 can be performed.

If the node succeeds in gaining control of the coordinator resource, operation transitions to 445 where the winning node informs other nodes of its success. Those nodes may take subsequent action based on such a "race success" message. Next, the winning node takes any additional steps necessary to fence of data and protect it from corruption. With some fence mechanisms, winning the race for the coordinator device may accomplish this data fencing task. For example, where the coordinator resource is some device or facility used to change a nodes power state, winning the race may necessarily cause other nodes to be reset or shut down, which in turn accomplishes the desired data protection of 450. In other examples, there may be no fencing operation needed, e.g., a cluster operating as a shared-nothing cluster, and there are no shared data resources to fence off. In still other examples, both racing and fencing operations will be necessarily separate. Further examples of these operations will be discussed below in the context of several different fencing techniques. In step 455, a determination is made whether the data fencing has been successful. This might include confirming that any nodes from "losing" subclusters are unregistered from a coordinator device, ensuring that only nodes in the winning subcluster have access to the data, and the like. Although not illustrated, this process can also include steps similar to those illustrated at 425, 430, and 435. Thus, there may be a timeout associated with the data fencing step (e.g., when this process is explicitly separate from the race process) and there can also be multiple data fencing mechanisms to try. If the fence has failed, an error condition has occurred (440) and subsequent steps can be performed as described above. If the fence has succeeded that the remaining nodes can resume normal operation and the process ends (460).

The flow charts of FIGS. 3 and 4 illustrate some of the many operational examples of the I/O fencing tools and techniques disclosed in the present application. Those having ordinary skill in the art will readily recognize that certain steps or operations illustrated in FIGS. 3 and 4 can be eliminated or taken in an alternate order. Moreover, the methods described in FIGS. 3 and 4 are typically implemented as one or more software programs for a computer system and are encoded in a computer readable medium as instructions executable on one or more processors. The computer readable medium can be any one of an electronic storage medium, a magnetic storage medium, an optical storage medium, and a communications medium conveying signals encoding the instructions. Separate instances of these programs can be executed on separate computer systems in keeping with the multi-process methods described above. Thus, although certain steps have been described as being performed by certain devices, software programs, processes, or entities, this need not be the case and a variety of alternative implementations will be understood by those having ordinary skill in the art. Additionally, the software components described can be implemented in a variety of different ways. For example, those components described as operating in a kernel or a user memory space are not necessarily limited to those implementations.

Those having ordinary skill in the art will readily recognize that the techniques described above can be utilized in a variety of coordinator resources, different storage devices, and cluster systems with variations in, for example, the number of nodes, the type of cluster operation (failover, parallel, etc.), the number and type of shared data resources, the number of paths between nodes and shared data resources, and the number and type of coordinator resources. Similarly, the techniques described above can be used in a variety of hardware architectures that might not represent conventional cluster configurations, such as a storage area network appliances, switches, routers, etc.

Figure 5A:
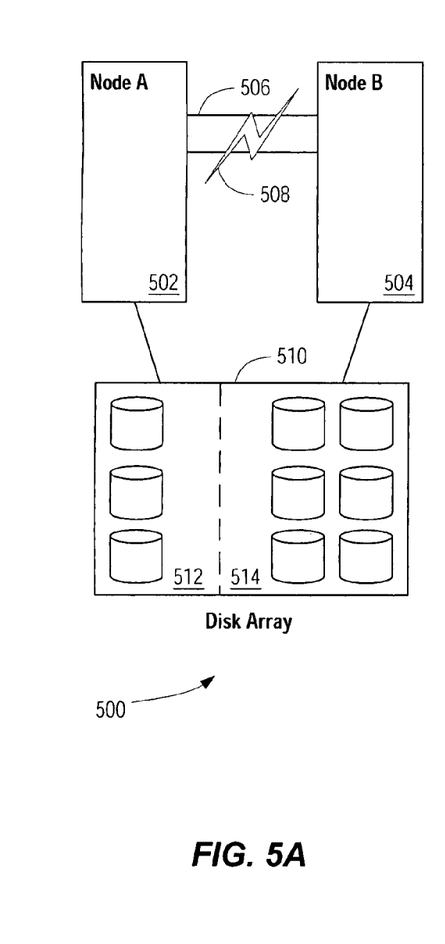
FIGS. 5A-5F illustrate several examples I/O fence mechanisms.

FIG. 5A is a simplified block diagram of a two node cluster experiencing a private network failure. For convenience, various cluster elements such as clients are not shown. In this example, cluster 500 is configured for failover operation. A failover service only runs on one node at a time. If the node running the service fails, the service will be restarted on another node in the cluster. Thus, for example, node A 502 is executing some user application and node B 504 stands by in the event that node A fails. Private network 506 has failed (508) and the two nodes lose contact with each other, thereby giving rise to a split-brain or partition event. Each of nodes 502 and 504 is coupled to disk array 510 that includes a number of data disks 514 and three coordinator disks 512. Thus, in the example of FIG. 5A, coordinator disks 512 serve as the coordinator resources used by a corresponding fence mechanism. If coordinator disks 512 are SCSI-2 disks, then a SCSI-2 based fence mechanism can be implemented where nodes accessing the coordinator disks 512 are allowed to reserve a disk drive using the SCSI-2 "reserve" command and subsequently release the disk drive for use by another device via the "release" command. If coordinator disks 512 are SCSI-3 compliant devices, the more robust persistent reservation commands can be used. The following example outlines the use of a SCSI-3 fencing technique and makes reference to steps described in FIGS. 3 and 4.

The following registration steps can be performed before, during, or after a cluster join operation such as 340. A node (e.g., node A 502) registers with the designated coordinator disks (512) using the PERSISTENT OUT-REGISTER command. Alternately, registration can occur manually when a system administrator configures the system. For example, a system administrator starts an application on node A using appropriate cluster server software. Alternately, this step can be performed as part of an automatic start-up process. Node A then registers with the data disks 514 in storage array 510 by issuing a PERSISTENT OUT—REGISTER command on the path between the node and storage array 510 using a registration key, e.g., "K1." Node A 502 checks if other nodes are registered with any of the data disks 514 using the PERSISTENT IN-READ KEYS command.

Next, node A 502 prevents data disks 514 from accepting I/Os from other nodes by issuing a PERSISTENT OUT-RESERVE with a "write exclusive-registrants only" (WXRO) reservation. This means that data disks 514 will only accept write requests from a registered node. A node which is not registered and attempting to write to the disk will receive a SCSI RESERVATION CONFLICT error. Any cluster applications can now proceed normally. For example, a database contained one or more of data disks 514 is started on node A. Node A reads and writes to the data disks normally, and cluster operation proceed (350).

As described above with respect to step 405, some event may cause a cluster partition. For example, private network 506 has failed and the two nodes lose contact with each other. On one side of the partition is node A, and on the other side node B. One or more of the fence components (driver, daemon, and fence mechanism) on node A and node B race for control (415) of coordinator disks 512 since these nodes are the lowest node IDs (in this case the only IDs) in their respective subclusters. This is performed by node A attempting to unregister node B from the coordinator disks using the PERSISTENT OUT-PREEMPT AND ABORT command while node B is attempting to do the same to node A. The respective fence components determine (420) if their node was successful in gaining control of a majority of the coordinator disks 512.

One subcluster will win and the other subcluster will receive an error that it is not registered with the coordinator disk(s). In the case where node A wins the race, it continues operation with the I/O fence in place. Had node A failed to gain control of a majority of coordinator disks 512, it would eject itself from the cluster. Similarly, if node B determines that it gained control of the majority of coordinator disks 512, it ensures that node A is unregistered from data disks 514. To perform that task, node B sends PERSISTENT OUT-REGISTER commands to each data disk 514 using node B's key, e.g., "K2". In general, the commands to each data disk are sent in parallel. This task is performed because node B has not previously registered with data disks 514. Node B can then issue PERSISTENT IN-READ KEYS commands to determine the keys registered on data disks 514. If any of the data disks have a key not belonging to node B, e.g., not K2, node B can then issue PERSISTENT OUT-PREEMPT and ABORT commands to the appropriate data disks with a victim key value corresponding to that read in the previous command. In this example, node B finds that node A (key K1) is still registered, and accordingly unregisters node A. Thus, node B takes over operation with an I/O fence in place. At this point additional action can be taken by node B. For example, node B can prevent data disks 514 from accepting I/Os from other nodes by issuing a PERSISTENT OUT-RESERVE with a "write exclusive-registrants only" (WXRO) reservation.

This example illustrates some of the specific operations performed by fence components in order to implement a SCSI-3 based fencing technique. As will be understood by those having skill in the art, the specific operations needed to implement a particular fencing technique will largely depend on the type of coordinator resource(s) used. FIGS. 5B-5F illustrate a number of other fencing techniques that can be implemented using the above-described fence components.

Figure 5B:
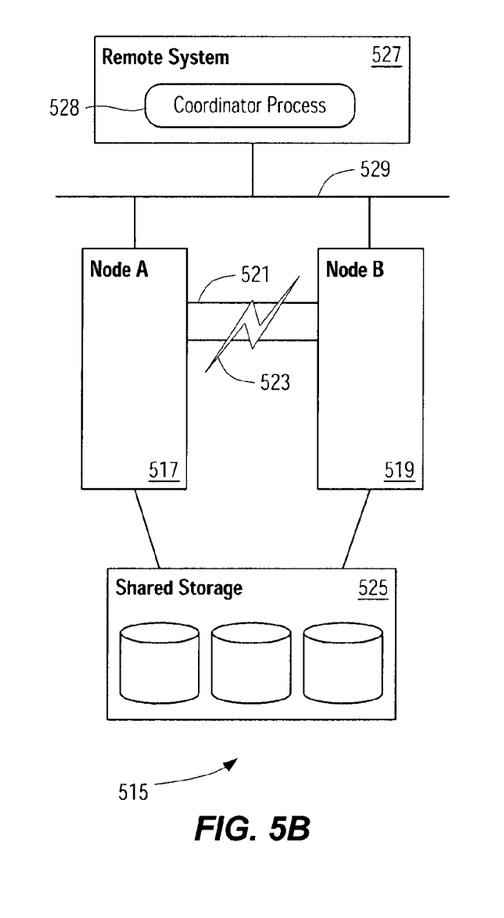

FIG. 5B illustrates a two node cluster 515 formed from nodes 517 and 519. The nodes are both coupled to shared storage 525 which could be implemented as one or more storage devices such as JBODs, disk arrays, and the like. Nodes 517 and 519 use an established communication link between them (private network 521) to exchange heartbeat information. A private network failure (523) gives rise to a split-brain condition or cluster partition event. Nodes 517 and 519 are also coupled to LAN/WAN 529 which in turn is coupled to remote computer system 527. In a typical implementation, remote computer system 527 is "remote" in the sense that it is not located in proximity to either of nodes 517 and 519. Thus, remote computer system 527 might be located in a different room, floor, building, campus, city, state, country, etc. from one or both of the cluster nodes. In general, remote computer system 527 is kept in a remote location to reduce the likelihood that it might be susceptible to events having an adverse impact on node operation. Remote computer system 527 operates one or more coordinator processes 528 that serve as the coordinator resource for a corresponding fence mechanism.

For example, nodes responding to a partition event will seek to gain control or ownership of the coordinator process as part of a fence operation. Depending on the implantation, one or more coordinator processes can be used. Moreover, cluster operation can include various coordinator process registration steps much like those described above in the context of the SCSI-3 fence mechanism. In one embodiment, the coordinator process is maintained by a cluster management system that enables the management of multiple clusters and their applications from a single console. An example of such cluster management software is the VERITAS Global Cluster Manager™ product provided by VERITAS Software Corporation.

Figure 5C:
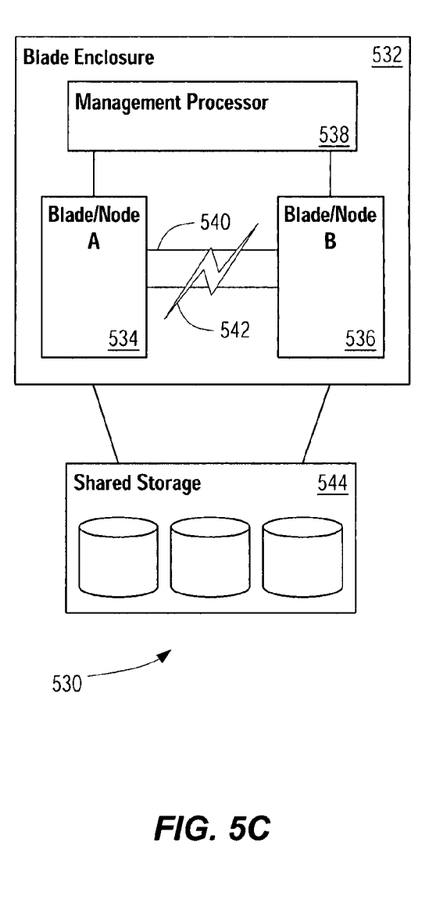

FIG. 5C illustrates another fencing technique. Two node cluster 530 includes nodes 534 and 536. Nodes 534 and 536 are implemented on individual blade servers that are part of a larger blade enclosure 532. Each blade server/node is an independent server, with its own processors, memory, storage, network controllers, operating system and applications. Enclosure 532 provides some common resources, e.g., power supplies, network connectivity, and management functionality such as management processor 538. The individual blade servers and/or the entire blade system is coupled to shared storage 544 which could be implemented as one or more storage devices such as JBODs, disk arrays, and the like. Nodes 534 and 536 also use some communication link between them (private network 540) to exchange heartbeat information. A private network failure (542) gives rise to a split-brain condition or cluster partition event. In this example, the management processor and/or one or more processes operating on the management processor provide the coordinator resource used in the fencing mechanism. Control of processor 538 and/or any corresponding processes is sought when cluster partition occurs. As with other implementations, the losing node is removed from the cluster.

Figure 5D:
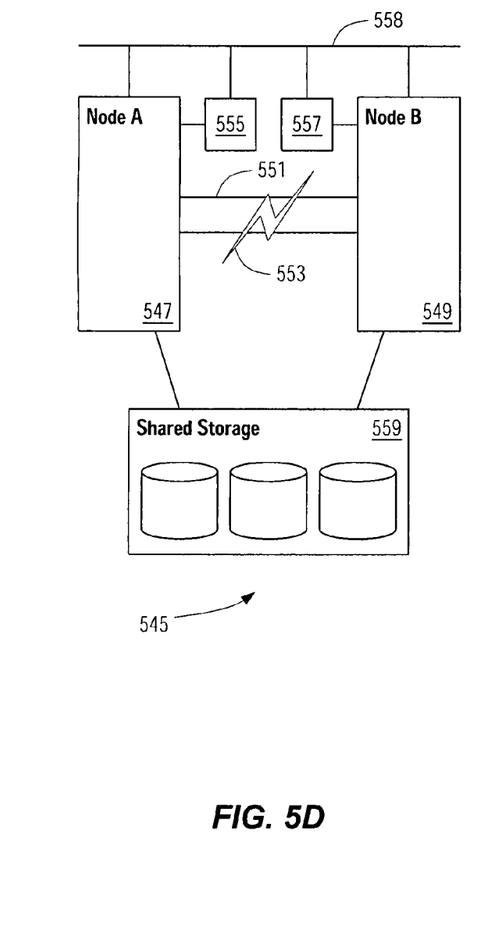

In FIG. 5D, power distribution units 555 and 557 serve as the coordinator resources used by another fence mechanism. Two node cluster 545 includes nodes 547 and 549 which are coupled to shared storage 559 typically implemented as one or more storage devices such as JBODs, disk arrays, and the like. Power distribution units 555 and 557 are coupled to respective nodes to provide remote power control of the nodes. Power distribution units 555 and 557 are typically coupled to some other communications bus 558, e.g., a LAN/WAN 558, dedicated serial connection, or the like, so as to receive remote control commands. In a typical example, power distribution units 555 and 557 provide one or more of: individual electrical outlet control, power on and off delays, current monitoring, alarm thresholds, and network management. Individual outlet control allows users to turn outlets on, turn outlets off, or cycle power to equipment, which can reboot nodes. Power delays allow users to determine the order in which equipment is powered up or down. Users can typically access, configure, and control power distribution units through web, SNMP, or telnet interfaces. In some examples, power distribution units are built into the servers operating as nodes, or are part of other related equipment such as an uninterruptible power supply (UPS).

Nodes 547 and 549 use an established communication link between them (private network 551) to exchange heartbeat information. Private network failure (553) gives rise to a split-brain condition or cluster partition event. When this occurs, the fence components operating on each node race to control power distribution units. Thus, node A would attempt to control power distribution unit 557 associated with node B so as to turn off or reset that server. This attempt typically takes the form of sending one or more commands to power distribution unit 557 via bus/network 558. Similarly, node B races to control power distribution unit 555. This illustrates an example of a well known technique often referred to as STONITH (shoot the other node in the head). With STONITH fencing, forcing errant cluster nodes to reset, allows the nodes to attempt to rejoin the cluster and acquire resources in a normal fashion or recognize that they cannot rejoin. In some cases, ejected nodes are simply shutdown rather than rebooted. With this type of fencing technique, the fence mechanism is specifically designed to send necessary commands to power distribution units.

Figure 5E:
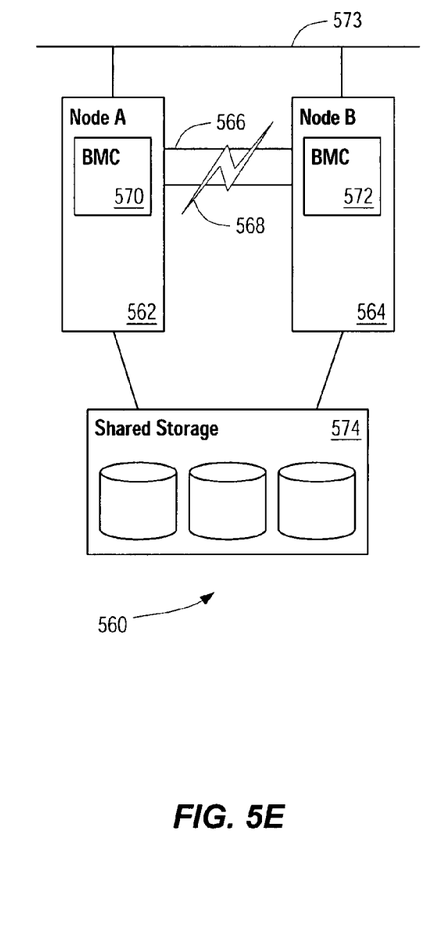

A related STONITH fencing technique is illustrated in FIG. 5E. Two node cluster 560 includes nodes 562 and 564 which are coupled to shared storage 574 typically implemented as one or more storage devices such as JBODs, disk arrays, and the like. Nodes 562 and 564 use an established communication link between them (private network 566) to exchange heartbeat information. Private network failure (568) gives rise to a split-brain condition or cluster partition event. Nodes 562 and 564 also use some other communications link, e.g., a LAN/WAN 573. Nodes 562 and 564 support some type of node management standard that allows management commands to be received remotely, e.g., via network 573. In this example, nodes 562 and 564 support the Intelligent Platform Management Interface (IPMI) standard as described in, for example, *Intelligent Platform Management Interface Specification Second Generation v2.0*, ©2004 Intel Corporation, Hewlett-Packard Company, NEC Corporation, and Dell Computer Corporation (http://www.intel.com/design/servers/ipmi/).

IPMI standardizes the implementation of management functions in servers and telecom equipment. IPMI compatible devices include basic IPMI building blocks, such as management microcontrollers, sensors, chips sets and firmware. The IPMI specification defines standardized, abstracted interfaces to a platform management subsystem. IPMI includes the definition of interfaces for extending platform management between boards within a main chassis, and between multiple chassis. Platform management encompasses both monitoring and control functions that are built in to the platform hardware and primarily used for the purpose of monitoring the health of the system hardware. This typically includes monitoring elements such as system temperatures, voltages, fans, power supplies, bus errors, system physical security, etc. It also includes automatic and manually driven recovery capabilities such as local or remote system resets and power on/off operations. These capabilities can be used to implement a STONITH-type fencing mechanism.

IPMI uses message-based interfaces for the different interfaces to the platform management subsystem such as IPMB, serial/modem, LAN, ICMB, PCI Management Bus, and the system software-side "System Interface" to a baseboard management controller (BMC). To illustrate this functionality, nodes 562 and 564 include BMCs 570 and 572, respectively. IPMI messages share the same fields in the message 'payload'—regardless of the interface (transport) over which they are transferred. IPMI messaging uses a request/response protocol where request messages are commonly referred to as commands. The use of a request/response protocol facilitates the transfer of IPMI messages over different transports. It also facilitates multi-master operation on busses like the IPMB and ICMB, allowing messages to be interleaved and multiple management controllers to directly intercommunicate on the bus. For example, the IPMI LAN interface adds formatting for sending IPMI messages as LAN packets.

When a split-brain condition is detected, the fence mechanisms operating on each of the nodes send appropriate IPMI commands in an effort to control the IPMI-related coordinator resource(s) present on the other nodes. Thus, node A would attempt to control BMC 572 associated with node B so as to turn off, reset, or otherwise prevent that server from accessing shared storage. This attempt typically takes the form of sending one or more commands to BMC 572 via bus/network 573. Similarly, node B races to control BMC 570. Forcing errant cluster nodes to reset, allows the nodes to attempt to rejoin the cluster and acquire resources in a normal fashion or recognize that they cannot rejoin. In some cases, ejected nodes are simply shutdown rather than rebooted.

Figure 5F:
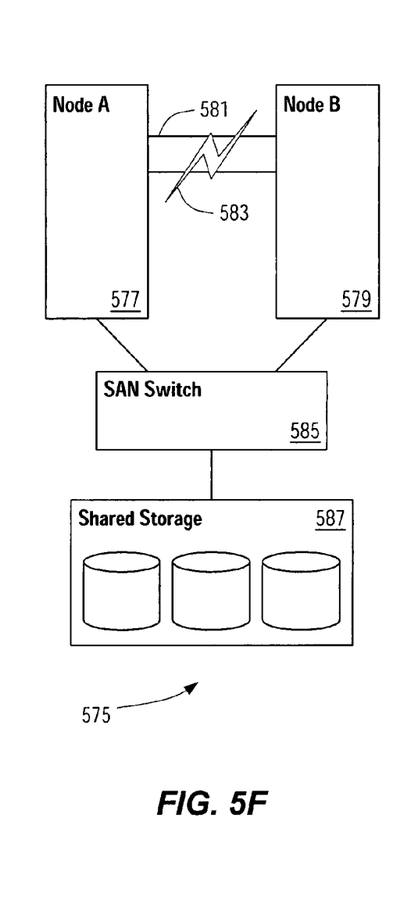

FIG. 5F illustrates yet another I/O fencing technique. Two node cluster 575 includes nodes 577 and 579 which are coupled to SAN switch 585. SAN switch 585 provides any-to-any connectivity for nodes/servers and storage devices, such as shared storage 587 typically implemented as one or more storage devices such as JBODs, disk arrays, and the like. Switches typically have internal bandwidth that is greater (usually a multiple of) link bandwidth and the ability to rapidly switch node connections from one to another. Typically, two or more SAN switches are interconnected to create a SAN fabric. In some cases, as single SAN switch can provide fabric functionality. Fabrics allow SAN optimization for performance, scalability, and availability. Thus, FIG. 5F is merely schematic, and many SAN implementations will include multiple shared storage devices and multiple SAN switches. Other network infrastructure components such as SAN hubs, SAN routers, and other SAN appliances can be included as part of cluster 575.

One feature often provided by devices such as SAN switch 585 is zoning. In general, zoning allows segmentation of a node by physical port, name, or address. The goal is to restrict accessibility of storage devices to servers, effectively subdividing the SAN into a set of private subnetworks. Within each of these subnetworks, cooperative sharing of storage resources is still implemented. Zoning techniques typically operate by blocking access to ranges of device/port addresses, e.g., Fibre Channel addresses. Thus, SAN switch 585 might maintain tables of Fibre Channel port addresses that are permitted to intercommunicate. If a port attempts to establish communication with a port address not in its zone, switch 585 blocks that communication. The software and/or devices in control of SAN zoning can thus serve as coordinator resources, control of which allow for I/O fencing and data protection needed when split-brain conditions occur. Fabric fencing provides data integrity while allowing a more ordered and graceful resolution of problems. It does this by focusing on control of server access to shared resources, as opposed to a server's ability to operate. With a SAN zoning fence mechanism, the cluster protects shared resources by using access control mechanisms within the SAN fabric or within the storage devices to control precisely which servers have access to which resources. The servers themselves can remain up even while they are excluded from accessing shared resources.

In one example, Nodes 577 and 579 use an established communication link between them (private network 581) to exchange heartbeat information. Private network failure (583) gives rise to a split-brain condition or cluster partition event. Detection of the split-brain condition causes fence components on each node to attempt to control a coordinator resource in charge of SAN zoning, e.g., SAN switch 585. In other implementations, the nodes race to control software that in turn manages one or more SAN devices that provide zoning. An example of such software is VERITAS Command-Central™ Storage, which integrates storage resource management, performance and policy management, storage provisioning and zoning capabilities to ensure that a particular storage infrastructure runs efficiently. The wining node is the node that succeeds in having the other node zoned out of access to shared storage, thereby protecting the storage. Similar techniques such as LUN masking and LUN mapping can also be used as part of the I/O fencing technique.

As illustrated by FIGS. 5A-5F, numerous different I/O fencing techniques can be implemented. The generalized fence mechanism framework described above, provides a convenient platform for implementing one or more of these (or other) techniques in a cluster environment. The generalized fence framework provides flexibility and expandability in ways that prior art I/O fence mechanisms have not.

FIG. 6 illustrates a block diagram of a computer system 600 for implementing the I/O strategy of the present invention. For example, computer system 600 can be an embodiment of one of the previously described cluster nodes, client computer systems, host computer systems, or even network and storage appliances. Computer system 600 includes a processor 610 and a memory 620 coupled together by communications bus 605. Processor 610 can be a single processor or a number of individual processors working together. Memory 620 is typically random access memory (RAM), or some other dynamic storage device, and is capable of storing instructions to be executed by the processor, e.g., fence daemon 255 and fence driver 220. Memory 620 is also used for storing temporary variables or other intermediate information during the execution of instructions by the processor 610.

Those having ordinary skill in the art will readily recognize that the techniques and methods discussed below can be implemented in software using a variety of computer languages, including, for example, traditional computer languages such as assembly language, Pascal, and C; object oriented languages such as C++, C#, and Java; and scripting languages such as Perl and Tcl/Tk. Additionally, software 255 and 220 can be provided to the computer system via a variety of computer readable media including electronic media (e.g., flash memory), magnetic storage media (e.g., hard disk 658, a floppy disk, etc.), optical storage media (e.g., CD-ROM 660), and communications media conveying signals encoding the instructions (e.g., via a network coupled to network interface 654).

Computer system 600 also includes devices such as keyboard & mouse 650, SCSI interface 652, network interface 654, graphics & display 656, hard disk 658, and CD-ROM 660, all of which are coupled to processor 610 by communications bus 607. It will be apparent to those having ordinary skill in the art that computer system 600 can also include numerous elements not shown in the figure, such as additional storage devices, communications devices, input devices, and output devices, as illustrated by the ellipsis shown. An example of such an additional computer system device is a fibre channel interface.

Although the present invention has been described with respect to a specific preferred embodiment thereof, various changes and modifications may be suggested to one skilled in the art and it is intended that the present invention encompass such changes and modifications that fall within the scope of the appended claims.

What is claimed is:

1. A method, performed on a first node, said method comprising:

selecting at least one of a plurality of input/output (I/O) fence mechanisms, wherein the at least one of a plurality of I/O fence mechanisms uses at least one coordinator resource, and said plurality of I/O fence mechanisms resides on said first node;

detecting when a computer system cluster including a plurality of nodes is partitioned into at least two subclusters;

generating fence mechanism comparison information operating on a first one of the plurality of nodes;

comparing the fence mechanism comparison information with at least one of remote fence mechanism comparison information and local fence mechanism comparison information of the plurality of nodes;

attempting to gain control of the at least one coordinator resource using the at least one of a plurality of I/O fence mechanisms; and removing at least one of the plurality of nodes from the computer system cluster in response to the attempting to gain control.

2. The method of claim 1, wherein
the fence mechanism comparison information corresponds to the at least one of a plurality of I/O fence mechanisms and operating on a first one of the plurality of nodes;
the remote fence mechanism comparison information corresponds to a fence mechanism configured to operate on a second one of the plurality of nodes; and
the local fence mechanism comparison information is stored on the first one of the plurality of nodes.

3. The method of claim 1 wherein the at least one coordinator resource includes at least one of: a shared data resource supporting small computer system interface version three (SCSI-3) persistent reservation commands, a shared data resource supporting SCSI-2 reservation commands; a storage area network (SAN) switch; a power distribution unit coupled to one of the plurality of nodes; an Intelligent Platform Management Interface (IPMI) device; a management processor coupled to the plurality of nodes; a process operating on a computer system; a volume; and a contact-response system.

4. The method of claim 1 wherein the selecting at least one of a plurality of I/O fence mechanisms further comprises selecting at least two of the plurality of I/O fence mechanisms, the method further comprising:
selecting a first one of the at least two of the plurality of I/O fence mechanisms to take priority over a second one of the at least two of the plurality of I/O fence mechanisms.

5. The method of claim 1 wherein the selecting at least one of a plurality of I/O fence mechanisms further comprises selecting at least two of the plurality of I/O fence mechanisms, and wherein the attempting to gain control of the at least one coordinator resource using the at least one of a plurality of I/O fence mechanisms further comprises:
attempting to gain control of a first one of the at least one coordinator resource using a first one of the at least two of the plurality of I/O fence mechanisms; and
attempting to gain control of a second one of the at least one coordinator resource using a second one of the at least two of the plurality of I/O fence mechanisms.

6. The method of claim 1 further comprising:
joining at least one of the plurality of nodes to the computer system cluster, wherein the manner of joining depends on the selecting at least one of a plurality of I/O fence mechanisms.

7. The method of claim 1 wherein the attempting further comprises:
sending a command to the at least one coordinator resource, the command for causing a change in power state for at least one of the plurality of nodes.

8. The method of claim 1 wherein the attempting further comprises:

sending a command to the at least one coordinator resource, the command for unregistering at least another one of the plurality of nodes from the at least one coordinator resource.

9. The method of claim 1 wherein the detecting further comprises:
monitoring a communications link between each of the plurality of nodes for a heartbeat signal; and
determining when the heartbeat signal is not present for a specified period of time.

10. The method of claim 1 further comprising:
sending, when the attempting is successful, a message to at least another one of the plurality of nodes that the attempting was successful.

11. A system comprising:
a first node including:
a first processor;
a first memory coupled to the first processor;
a second node including:
a second processor;
a second memory coupled to the second processor;
a communication link coupled between the first node and the second node;
a plurality of fence mechanism modules residing on said first node, each fence mechanism module configured to implement at least one input/output (I/O) fence mechanism;
a fence mechanism manager residing on said first node and configured to invoke at least one of the plurality of fence mechanism modules, wherein the at least one of the plurality of fence mechanism modules uses at least one coordinator resource; and
a fence driver residing on said first node, in communication with the fence mechanism manager and configured to:
receive an indication that a distributed computer system has partitioned into at least two subclusters,
generate fence mechanism comparison information corresponding to the at least one of the plurality of fence mechanism modules,
compare the fence mechanism comparison information with at least one of: remote fence mechanism comparison information and local fence mechanism comparison information of the plurality of nodes, and
cause at least one of the fence mechanism manager and the at least one of the plurality of fence mechanism modules to attempt to control of the at least one coordinator resource.

12. The system of claim 11 wherein the at least one coordinator resource includes at least one of: a shared data resource supporting small computer system interface version three (SCSI-3) persistent reservation commands, a shared data resource supporting SCSI-2 reservation commands; a storage area network (SAN) switch; a power distribution unit coupled to one of the plurality of nodes; an Intelligent Platform Management Interface (IPMI) device; a management processor coupled to the plurality of nodes; a process operating on a computer system; a volume; and a contact-response system.

13. The system of claim 11,
wherein at least one of the fence mechanism manager, the at least one of the plurality of fence mechanism modules, and the fence driver are encoded as instructions stored in at least one of the first memory and the second memory and executable on at least one of the first processor and the second processor.

14. The system of claim 13 wherein a first portion of the first memory is used as a kernel memory space and wherein a second portion of the first memory is used as a user memory space, and wherein the fence driver is stored in the kernel memory space.

15. The system of claim 11 wherein at least one of the fence mechanism manager, the at least one of the plurality of fence mechanism modules, and the fence driver is further configured to:
   determine which of a plurality of nodes in one of the at least two subclusters will race for control of the at least one coordinator resource.

16. The system of claim 11 wherein the at least one of the plurality of fence mechanism modules is further configured to:
   join at least one of a plurality of nodes to the distributed computer system, wherein the manner of joining depends on the at least one I/O fence mechanism implemented by the at least one of the plurality of fence mechanism modules.

17. The system of claim 11 wherein the at least one of the plurality of fence mechanism modules is further configured to:
   send a command to the at least one coordinator resource, the command for causing a change in power state for at least one of a plurality of nodes.

18. The system of claim 11 wherein the at least one of the plurality of fence mechanism modules is further configured to:
   send a command to the at least one coordinator resource, the command for unregistering at least one of a plurality of nodes from the at least one coordinator resource.

19. A computer readable storage medium storing program instructions executable on a processor, wherein the program instructions are operable to cause said processor to implement each of:
   selecting at least one of a plurality of input/output (I/O) fence mechanisms, wherein the at least one of a plurality of I/O fence mechanisms uses at least one coordinator resource and said plurality of I/O fence mechanisms resides on a first node;
   detecting when a computer system cluster including a plurality of nodes is partitioned into at least two subcluster;
   generating fence mechanism comparison information operating on a first one of the plurality of nodes;
   comparing the fence mechanism comparison information with at least one of: remote fence mechanism comparison information and local fence mechanism comparison information of the plurality of nodes;
   attempting to gain control of the at least one coordinator resource using the at least one of a plurality of I/O fence mechanisms; and
   removing at least one of the plurality of nodes from the computer system cluster in response to the attempting to gain control.

20. The computer readable storage medium of claim 19 further comprising program instructions operable to implement each of:
   generating the fence mechanism comparison information, wherein the fence mechanism comparison information corresponds to the at least one of a plurality of I/O fence mechanisms and operating on a first one of the plurality of nodes;
   the remote fence mechanism comparison information corresponds to a fence mechanism configured to operate on a second one of the plurality of nodes, and
   the local fence mechanism comparison information is stored on the first one of the plurality of nodes.

21. The computer readable storage medium of claim 19 wherein the at least one coordinator resource includes at least one of: a shared data resource supporting small computer system interface version three (SCSI-3) persistent reservation commands, a shared data resource supporting SCSI-2 reservation commands; a storage area network (SAN) switch; a power distribution unit coupled to one of the plurality of nodes; an Intelligent Platform Management Interface (IPMI) device; a management processor coupled to the plurality of nodes; a process operating on a computer system; a volume; and a contact-response system.

22. The computer readable storage medium of claim 19 wherein the selecting at least one of a plurality of I/O fence mechanisms further comprises program instructions operable to implement selecting at least two of the plurality of I/O fence mechanisms, the computer readable medium further comprising program instructions operable to implement:
   selecting a first one of the at least two of the plurality of I/O fence mechanisms to take priority over a second one of the at least two of the plurality of I/O fence mechanisms.

23. The computer readable storage medium of claim 19 wherein the selecting at least one of a plurality of I/O fence mechanisms further comprises program instructions operable to implement selecting at least two of the plurality of I/O fence mechanisms, and wherein the attempting to gain control of the at least one coordinator resource using the at least one of a plurality of I/O fence mechanisms further comprises program instructions operable to implement each of:
   attempting to gain control of a first one of the at least one coordinator resource using a first one of the at least two of the plurality of I/O fence mechanisms; and
   attempting to gain control of a second one of the at least one coordinator resource using a second one of the at least two of the plurality of I/O fence mechanisms.

24. The computer readable storage medium of claim 19 further comprising program instructions operable to implement:
   joining at least one of the plurality of nodes to the computer system cluster, wherein the manner of joining depends on the selecting at least one of a plurality of I/O fence mechanisms.

25. The computer readable storage medium of claim 19 further comprising program instructions operable to implement:
   sending a command to the at least one coordinator resource, the command for causing a change in power state for at least one of the plurality of nodes.

26. The computer readable storage medium of claim 19 further comprising program instructions operable to implement:
   sending a command to the at least one coordinator resource, the command for unregistering at least another one of the plurality of nodes from the at least one coordinator resource.

27. The computer readable storage medium of claim 19 further comprising program instructions operable to implement each of:
   monitoring a communications link between each of the plurality of nodes for a heartbeat signal; and determining when the heartbeat signal is not present for a specified period of time.

28. The computer readable storage medium of claim 19 further comprising program instructions operable to implement:
   sending, when the attempting is successful, a message to at least another one of the plurality of nodes that the attempting was successful.

29. An apparatus comprising:

a processor;

a means for causing said processor to perform selecting at least one of a plurality of means for performing input/output fencing, wherein the at least one of a plurality of means for performing I/O fencing uses at least one coordinator means and said plurality of I/O fence mechanism resides on a first node;

a means for causing said processor to perform detecting when a computer system cluster including a plurality of nodes is partitioned into at least two subclusters;

a means for generating I/O fencing comparison information operating on a first one of the plurality of nodes;

a means for comparing the I/O fencing comparison information with at least one of:

remote comparison information, and local comparison information of the plurality of nodes;

a means for causing said processor to perform attempting to gain control of the at least one coordinator means using the at least one of a plurality of means for performing I/O fencing; and a means for causing said processor to perform removing at least one of the plurality of nodes from the computer system cluster.

30. The apparatus of claim 29 further comprising:

the means for generating I/O fencing mechanism comparison information further comprises:

a means for generating I/O fencing comparison information corresponding to the at least one of a plurality of means for performing I/O fencing.

31. The apparatus of claim 29 further comprising:

a means for joining at least one of the plurality of nodes to the computer system cluster, wherein the manner of joining depends on the at least one of a plurality of means for performing I/O fencing.

32. The apparatus of claim 29 further comprising:

a means for sending a command to the at least one coordinator means, the command for causing a change in power state for at least one of the plurality of nodes.

33. The apparatus of claim 29 further comprising:

a means for sending a message to at least another one of the plurality of nodes when that the means for attempting to gain control of the at least one coordinator means is successful.

* * * * *